United States Patent
Roziere et al.

(10) Patent No.: US 7,309,523 B2
(45) Date of Patent: Dec. 18, 2007

(54) HYBRID MATERIAL, USE OF SAID HYBRID MATERIAL AND METHOD FOR MAKING SAME

(75) Inventors: Jacques Roziere, Montpellier (FR); Deborah Jones, Montpellier (FR); Lydie Tchicaya-Boukary, Montpellier (FR); Bernd Bauer, Vaihingen (DE)

(73) Assignee: FuMA-Tech Gesellschaft für funktionelle Membranen und Anlagentechnologie mbH, Ingbert/Saar (DE)

( * ) Notice: Subject to any disclaimer, the term of this patent is extended or adjusted under 35 U.S.C. 154(b) by 325 days.

(21) Appl. No.: 10/332,281

(22) PCT Filed: Jul. 6, 2001

(86) PCT No.: PCT/EP01/07774

§ 371 (c)(1),
(2), (4) Date: Jul. 22, 2003

(87) PCT Pub. No.: WO02/05370

PCT Pub. Date: Jan. 17, 2002

(65) Prior Publication Data

US 2004/0053060 A1    Mar. 18, 2004

(30) Foreign Application Priority Data

Jul. 7, 2000    (FR) ................... 00 08933

(51) Int. Cl.
*B32B 3/26* (2006.01)
*H01B 1/12* (2006.01)

(52) U.S. Cl. ............... 428/305.5; 428/312.2; 428/312.6; 428/312.8; 428/306.6; 252/519.34; 252/519.21; 252/519.2; 252/519.33; 523/216; 523/200; 523/210

(58) Field of Classification Search ............. 428/312.2, 428/321.6, 312.8, 307.3; 523/216, 200, 210; 252/519.34, 519.2, 519.21, 519.33
See application file for complete search history.

(56) References Cited

U.S. PATENT DOCUMENTS

| 5,523,181 A | 6/1996 | Stonehart et al. |
| 5,766,787 A | 6/1998 | Watanabe et al. |
| 6,313,219 B1 * | 11/2001 | Taylor-Smith ............... 524/853 |
| 6,395,341 B1 * | 5/2002 | Arakawa et al. ......... 427/419.1 |
| 6,903,148 B2 * | 6/2005 | Suzuki et al. ............... 523/216 |

FOREIGN PATENT DOCUMENTS

WO    WO 00 66652 A    11/2000

OTHER PUBLICATIONS

Laconti A B et al., "Proton Exchange Membrane Electrochemical Capacitors and Fuel Cells for Pulse Power Applications" Proceedings of the International Power Sources Symposium, U.S., New York, IEEE, vol. Symp. 35, Jun. 22, 1992, pp. 298-301, XP000342087, ISBN: 0-7803-0552-3.

* cited by examiner

*Primary Examiner*—Hai Vo
(74) *Attorney, Agent, or Firm*—The Nath Law Group; Gary M. Nath; Tanya E. Harkins

(57) ABSTRACT

The present invention relates to a hybrid material, its use and its production process.

The hybrid material comprises a polymer with acid groups. The inorganic part of the said hybrid material is constituted by the combination of at least two metal oxide components, whereof at least one comprises a functional group permitting an interaction and a spatial relationship with the acid groups of the polymer.

43 Claims, 14 Drawing Sheets

Figure 1
--------

Hydrolysis:

$$Si(OR)_4 + H_2O \rightleftharpoons (OH)Si(OR)_3 + ROH$$

$$(OH)Si(OR)_3 + H_2O \rightleftharpoons (OH)_2Si(OR)_2 + ROH$$

$$(OH)_2Si(OR)_2 + H_2O \rightleftharpoons (OH)_3Si(OR) + ROH$$

$$(OH)_3Si(OR) + H_2O \rightleftharpoons Si(OH)_4 + ROH$$

Condensatino of alkoxy and hydroxyl groups (alcoxolation)

$$\equiv Si-OR + OH-Si\equiv \rightleftharpoons \equiv Si-O-Si\equiv + ROH$$

Condensation of hydroxyl groups (oxolation)

$$\equiv Si-OH + OH-Si\equiv \rightleftharpoons \equiv Si-O-Si\equiv + HOH$$

Figure 2:
---------

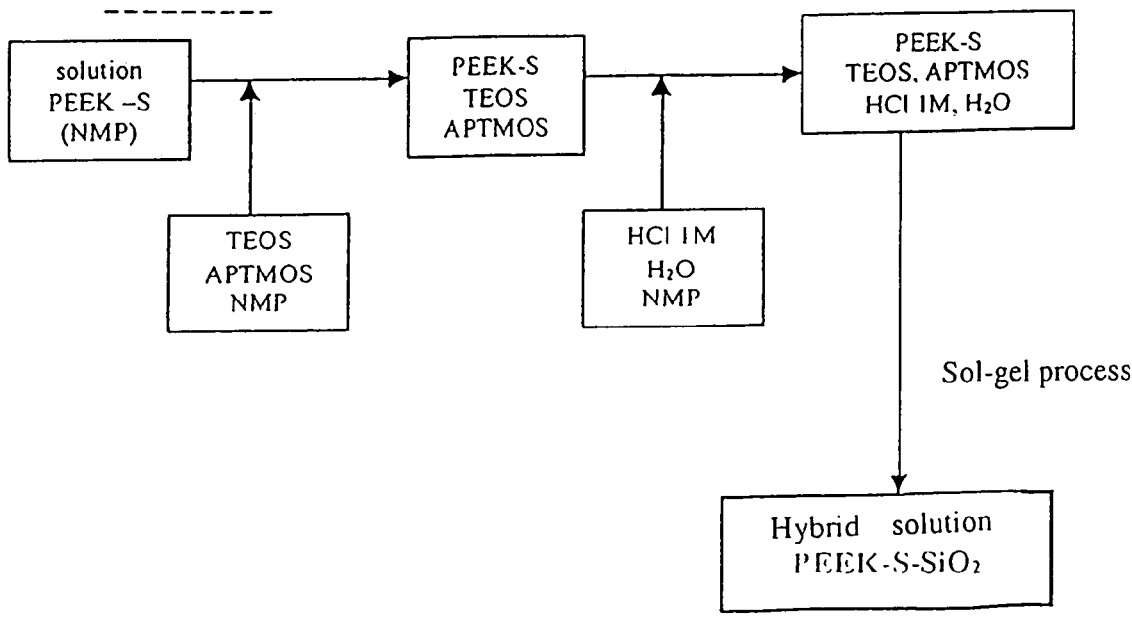

Figure 3:
---------

| Sample | Calculated SiO$_2$ (wt%) | TEOS/ APTMOS |
|---|---|---|
| PEEK-S 0.0.0 | 0 | - |
| PEEK-S -TEAP 10.90.10 | 10 | 90/10 |
| PEEK-S -TEAP 10.80.20 | 10 | 80/20 |
| PEEK-S -TEAP 20.90.10 | 20 | 90/10 |
| PEEK-S -TEAP 20.80.20 | 20 | 80/20 |

Figure 4:
---------

| Sample | APTMOS Introduced (meq.g$^{-1}$) | Calculated cec (meq.g$^{-1}$) | Experimental cec (meq.g$^{-1}$) |
|---|---|---|---|
| PEEK-S | 0 | - | 1,3 |
| PEEK-S -TEAP 10.90.10 | 0,16 | 1,14 | 1,16 |
| PEEK-S -TEAP 10.80.20 | 0,32 | 0,98 | 1,05 |
| PEEK-S -TEAP 20.90.10 | 0,32 | 0,98 | 1,09 |
| PEEK-S -TEAP 20.80.20 | 0,66 | 0,64 | 0,8 |

(a): PEEK-S unmodified, (b): PEEK-S-TEAP10.90.10 / PEEK-S-TEAP 10.80.20, (c): PEEK-S-TEAP20.80.20, (d): PEEK-S-TEAP20.90.10.

| Sample | Calculated SiO₂ Content (wt%) | Experimental SiO₂ content (wt%) |
|---|---|---|
| PEEK-S -TEAP 10.90.10 | 10 | 11 |
| PEEK-S -TEAP 10.80.20 | 10 | 11 |
| PEEK-S -TEAP 20.90.10 | 20 | 21 |
| PEEK-S -TEAP 20.80.20 | 20 | 23 |

| Sample | Experimental cec (meq.g$^{-1}$) | Conductivity (S.cm$^{-1}$) | Conductivity (S.cm$^{-1}$) (after temperature rise to 100%) |
|---|---|---|---|
| PEEK-S | 1,28 | $2,8.10^{-2}$ | $2,5.10^{-2}$ |
| PEEK-S -TEAP 10.90.10 | 1,16 | $2,7.10^{-2}$ | $1,8.10^{-2}$ |
| PEEK-S -TEAP 10.80.20 | 1,05 | $1,1.10^{-2}$ | - |
| PEEK-S -TEAP 20.90.10 | 1,09 | $7,8.10^{-3}$ | $1,1.10^{-2}$ |
| PEEK-S -TEAP 20.80.20 | 0,8 | $3,0.10^{-3}$ | - |

| Membrane | Breaking load (Mpa) | Elongation at break (%) | Young's modulus (Mpa) |
|---|---|---|---|
| PEEK-S | 38,6 | 18 | 3362 |
| PEEK-S -TEAP 10.100.0 | 7,8 | 7,0 | 527 |
| PEEK-S -TEAP 10.90.10 | 32 | 4,7 | 4186 |
| PEEK-S -TEAP 10.80.20 | 36,8 | 5,8 | 2503 |
| PEEK-S -TEAP 20.100.0 | 6,0 | 10,9 | 202 |
| PEEK-S -TEAP 20.90.10 | 17,8 | 2,2 | 1840 |
| PEEK-S -TEAP 20.80.20 | 26 | 2,9 | 1822 |

Figure 12:
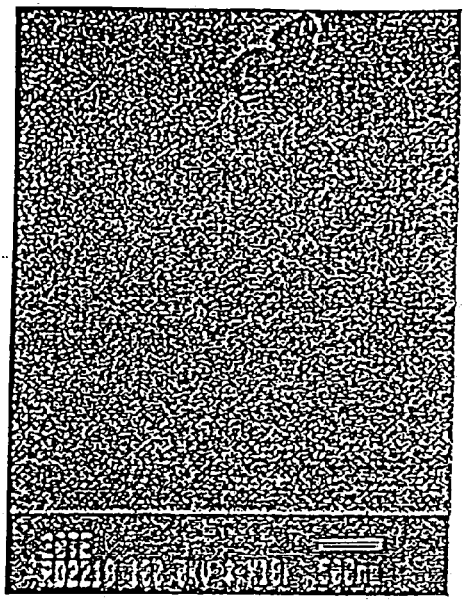 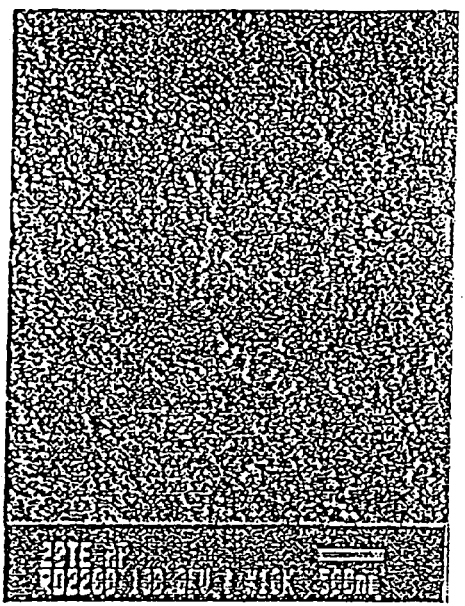
(a) (b)
(a): PEEK-S-TEAP20.100.0 (x 10K), (b): PEEK-S-TEAP20.90.10 (x 10K).
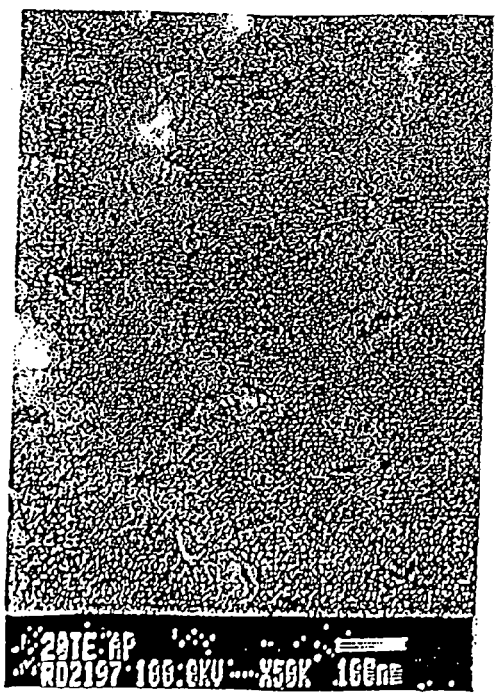
Figure 13
PEEK-S-TEAP (x 50k)

Figure 14:

| Sample | Calculated SiO$_2$ Content (wt%) | LUDOX/ APTMOS |
|---|---|---|
| PEEK-S 0.0.0 | 0 | |
| PEEK-S -LUAP 10.90.10 | 10 | 90/10 |
| PEEK-S -LUAP 10.80.20 | 10 | 80/20 |
| PEEK-S -LUAP 10.70.30 | 10 | 70/30 |
| PEEK-S -LUAP 20.90.10 | 20 | 90/10 |
| PEEK-S -LUAP 20.80.20 | 20 | 80/20 |
| PEEK-S -LUAP 20.70.30 | 20 | 80/20 |

(a) : PEEK-S unmodified  (b) : PEEK-S-LUAP10.90.10, PEEK-S-LUAP10.80.20, PEEK-S-LUAP10.70.30  (c) : PEEK-S-LUAP20.90.10, PEEK-S-LUAP20.80.20, PEEK-S-TEAP20.70.30.

| sample | Calculated SiO$_2$ content (wt%) | Experimental SiO$_2$ content (wt%) |
|---|---|---|
| PEEK-S -LUA P 10 .90.10 | 10 | 11 |
| PEEK-S -LUA P 10 .80.20 | 10 | 10 |
| PEEK-S -LUA P 10 .70.30 | 10 | 11 |
| PEEK-S -LUA P 20 .90.10 | 20 | 18 |
| PEEK-S -LUA P 20 .80.20 | 20 | 20 |
| PEEK-S -LUA P 20 .70.30 | 20 | 23 |

| Sample | Experimental cec (méq.g$^{-1}$) | Conductivity (S.cm$^{-1}$) | Conductivity (S.cm$^{-1}$) (after temperature rise to 100%) |
|---|---|---|---|
| PEEK-S | 1,28 | $2,8.10^{-2}$ | $2,8.10^{-2}$ |
| PEEK-S -LUAP 10.90.10 | 1,26 | $2,2.10^{-2}$ | - |
| PEEK-S -LUAP 10.80.20 | 1,21 | $2,0.10^{-2}$ | $1,1.10^{-2}$ |
| PEEK-S -LUAP 20.90.10 | 1,21 | $2,0.10^{-2}$ | - |
| PEEK-S -LUAP 20.80.20 | 1,10 | $9,0.10^{-3}$ | $1,8.10^{-2}$ |
| PEEK-S -LUAP 20.70.30 | 0,96 | $1,5.10^{-2}$ | - |

| Membrane | Breaking load (Mpa) | Elongation at break (%) | Young's modulus (Mpa) |
|---|---|---|---|
| PEEK-S | 38,6 | 18 | 3362 |
| PEEK-S -LUAP 10.100.0 | 10,5 | 7,5 | 476 |
| PEEK-S -LUAP 10.90.10 | 27,5 | 18,4 | 1217 |
| PEEK-S -LUAP 10.80.20 | 33,3 | 8,5 | 2400 |
| PEEK-S -LUAP 10.70.30 | 34,5 | 6,4 | 1346 |
| PEEK-S -LUAP 20.100.0 | 4,8 | 10,0 | 210 |
| PEEK-S -LUAP 20.90.10 | 25,3 | 13,7 | 1331 |
| PEEK-S -LUAP 20.80.20 | 27,6 | 16,7 | 1474 |
| PEEK-S -LUAP 20.70.30 | 29,7 | 3,7 | 1268 |

Figure 21:
(a)
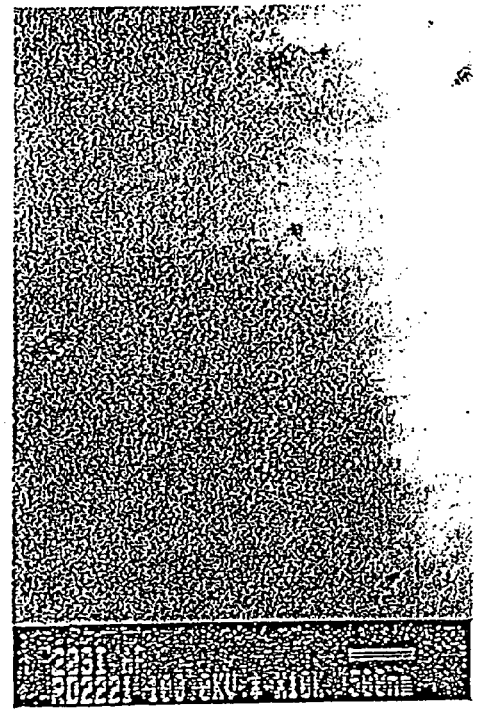
(b)
*LUAP: (a): PEEK-S-LUAP20.100.0 (x 10K), (b): PEEK-S-LUAP20.90.10 (x 10K).*
Figure 22:
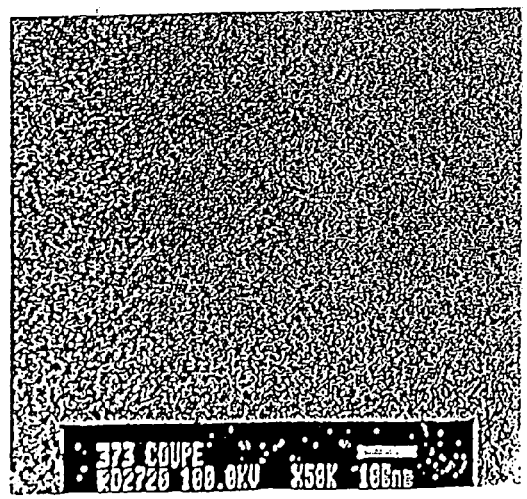

| membrane | thickness | temperature (°C) | resistance (Ω) | conductivity (S.cm⁻¹) |
|---|---|---|---|---|
| PEEK-S | 50 μm | 100 | 0,022 | 2,3 x 10⁻² |
| PEEK-S-TEAP 10.90.10 | 50 μm | 100 | 0,022 | 2,3 x 10⁻² |
| PEEK-S-LUAP 10.80.20 | 50 μm | 100 | 0,028 | 2,1 x 10⁻² |

Figure 25:

| run | SiO$_2$ (wt %) | n(SO$_3$H) / n(APTMOS) | n(TEOS) / n(APTMOS) | temperature of synthesis | observations | σ (S.cm$^{-1}$) |
|---|---|---|---|---|---|---|
| 1 | 50 | 1:1 | 20:1 | ambient | turbid flexible | $1.10^{-2}$ |
| 2 | 50 | 1:1 | 10:1 | ambient | translucent brittle | $5.10^{-1}$ |
| 3 | 50 | 1,5:1 | 15:1 | 60 → 80 | transparent flexible | $2.10^{-2}$ |
| 4 | 40 | 2:1 | 15:1 | 60 → 80 | transparent flexible | $1,5.10^{-2}$ |
| 5 | 60 | 1,5:1 | 15:1 | 60 → 80 | transparent brittle | |

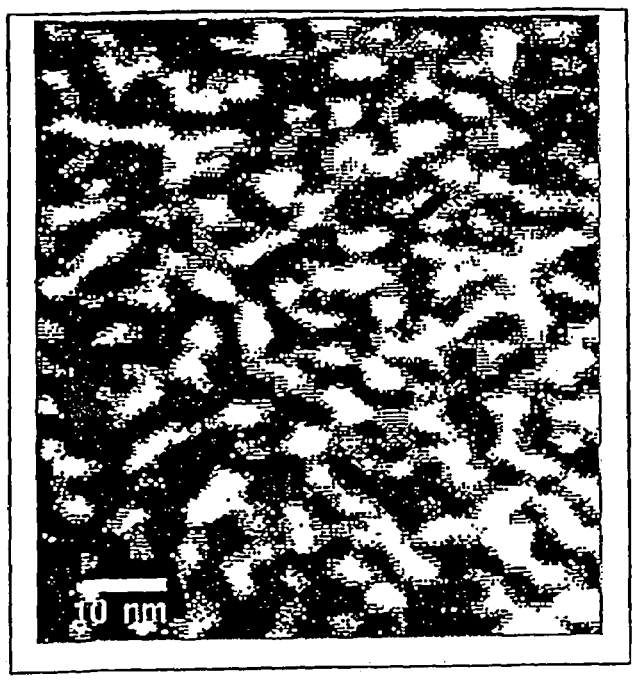
Figure 26:
Figure 27:
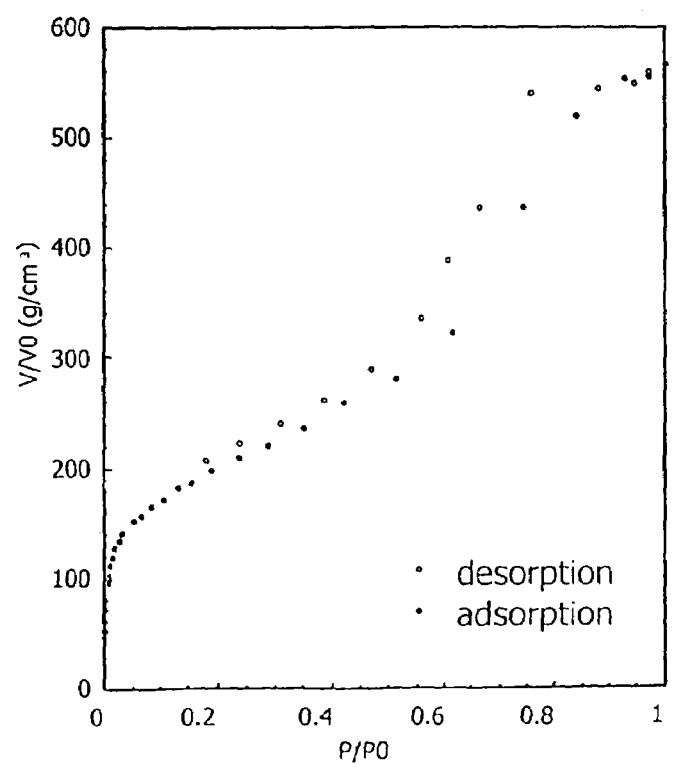

HYBRID MATERIAL, USE OF SAID HYBRID MATERIAL AND METHOD FOR MAKING SAME

FIELD OF THE INVENTION

The present invention relates to a hybrid material, its use and its production process.

BACKGROUND OF THE INVENTION

Among the fuel cells of greatest interest in applications relating to the motor vehicle or car sector are solid polymer electrolyte fuel cells.

In a solid electrolyte fuel cell, the polymer solid electrolyte is a proton exchange membrane. Such membranes must have a low permeability to reactant gases (e.g. $H_2$, $CH_4$ and $O_2$) and a maximum electrical and catalytic efficiency. They must also have adequate conduction properties and a minimum ohmic drop under a high current density.

Materials which can serve as a basis for such membranes must mainly have the following chemical and electrochemical properties: stability of the plastic material in a reducing medium, oxidation stability and hydrolysis stability. The membrane must also have a good hydrothermal stability. The use of perfluorine acid ionomers such as e.g. NAFION® has been proposed as a proton exchange membrane for such applications.

For many membranes the conductivity of the membrane is very sensitive to the degree of hydration. When subject to rising temperatures and temperatures close to the boiling point of water, due to the decreasing dehydration of the membrane the problem arises of a reduction in its electrical conductivity and at the same time an increase in the fuel transfer permeability. This leads to a reduction in the performance characteristics or a deterioration of the membrane.

However, numerous advantages are associated with the increase in the operating temperature of a proton exchange membrane fuel cell, namely in the case of stationary applications the cogeneration of heat can be useful. For use as the motive energy source of a vehicle, such as road vehicles and more specifically cars, the use of fuel cells operating at a higher temperature makes it possible to reduce the heat dissipation capacity of the cooling system and therefore reduce the bulk thereof. A reduction in the bulk facilitates the integration thereof in the vehicle and decreases the price.

SUMMARY OF THE INVENTION

The object of the present invention is to provide a material for developing thermostable membranes usable in electrochemical devices operating at temperatures above 90° C.

The objective of the present invention is realized by a hybrid material comprising a polymer having acid groups. The inorganic part of said acid material is constituted by the combination of at least two metal oxide components, whereof at least one comprises a functional group permitting an interaction and a spatial relationship with the acid groups of the polymer.

BRIEF DESCRIPTION OF THE DRAWINGS

Other aspects, advantages and novel features of the invention will become more apparent from the following detailed description of the invention when considered in conjunction with the accompanying drawings wherein:

FIG. 1 illustrates a reaction diagram of a sol-gel process for making hybrid polymer materials according to one embodiment of the invention;

FIG. 2 is a flow diagram for making a making hybrid polymer material according to an embodiment of the invention;

FIG. 3 shows the composition of several exemplary hybrid materials formed in accordance with the invention;

FIG. 4 demonstrates the experimental cation exchange capacity of the exemplary hybrid materials identified in FIG. 3;

FIG. 12(a) and (b) illustrate the dispersion of silica particles for S-PEEK-TEAP hybrid membranes;

FIG. 13 illustrates the s-PEEK-TEAP sample 20.90.10 at ×50,000 magnification;

FIG. 14 shows the compositions of several samples of hybrid polymer according to the invention;

FIGS. 21(a) and (b) illustrate s-PEEK-LUAP samples viewed at ×10,000 magnification using transmission electron microscopy;

FIG. 22 illustrates an s-PEEK-LUAP sample at ×50,000 magnification;

FIG. 25 demonstrates product co-condensation formation conditions;

FIG. 26 illustrates transmission electron microscopy of the specimen's morphology; and FIG. 27 is a graphical representation of the isotherms obtained by the BET method.

DETAILED DESCRIPTION OF THE PREFERRED EMBODIMENT

Figure 5:
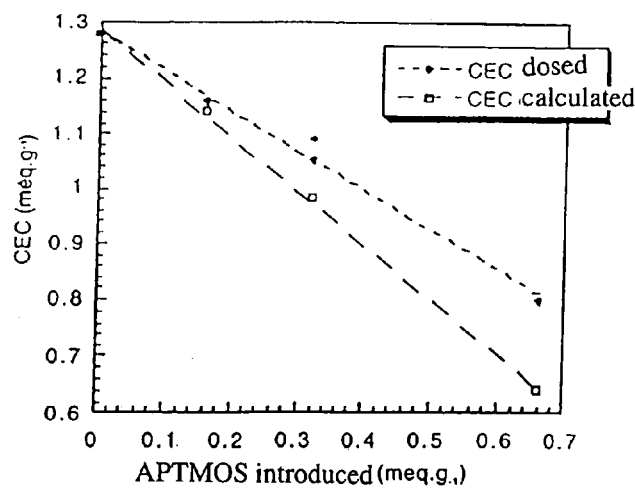
FIG. 5 is a graphical representation of the exchange capacity of exemplary hybrid materials identified in FIG. 4.

The hybrid material is in particular a polymer matrix. It is preferable for the metal oxide components to be of metals of group IV and in particular $SiO_2$. Without detriment to the general nature of the description hereinafter, the explanations are given for $SiO_2$, but the latter can be replaced by other metal oxides.

It can in particular be advantageous to use a polymer hybrid material having acid groups. This hybrid material contains a component with at least two $SiO_2$, each molecule of said component being fixed directly or indirectly to the polymer material whilst respecting a spatial relationship with respect to an acid group.

Preferably the acid groups are formed by sulphonic groups. It is also preferable for the acid polymer material to be an organic polymer. It can in particular be a fluorine-free organic polymer.

The material can be formed from a polymer such as e.g. a sulphonated polysulphone or a sulphonated polyarylether ketone. Sulphonated polyarylether ketone examples are sulphonated polyether ketones such as s-PEK, s-PEEK, s-PEEKK, s-PEKK and S-PEKEKK. An example of a polysulphone which can be sulphonated is marketed under the name Udel®. It is also possible to use other sulphonated polymer materials such as a sulphonated polyether sulphone (PES, e.g. sulphonated Victrex®), a sulphonated polyphenylether sulphone (s-PPSU, e.g. sulphonated Radel®), a sulphonated styrene/ethylene copolymer (s-SES) or a sulphonated styrene/butadiene copolymer (s-SBS, s-SIS, e.g. sulphonated Kraton®).

The two inorganic components can be formed from precursors having hydrolyzable functions permitting a copolymerization. One of these components can be constituted by a metal alkoxide $(RO)_xM$ and the other by a functionalized alkoxy silane $(R'O)_3SiR''$ or $(R'O)_2SiR_2''$. The functional groups are R", R and R' groups, which can be identical or different alkyl groups. The alkoxy groups can be linear, such as primary alkoxide groups (e.g. methoxy, propoxy) or secondary alkoxide groups (e.g. isopropoxy). It is preferable for the R" groups to have a basic character. These groups contain alkyl or aryl chains and have a basic function, preferably including a nitrogen atom. It is possible to have an amine group. Alternatively, one of the inorganic components can be introduced in the form of small metal oxide particles. It can be useful, but not essential, for the basic function to be located at one end of the R" group.

For such a material, it is possible to control its properties by varying the ratio between the number of acid groups of the polymer material and the number of groups having a basic character of the inorganic component. If the number of groups with a basic character is smaller than the number of acid groups of the polymer matrix, the hybrid material has free acid groups which can exert a certain function.

According to another preferred form of the hybrid material, the inorganic component is formed from metal oxide particles having at least locally on their surface a basic character. This basic character is preferably due to basic groups on the surface of the particle. According to a preferred embodiment of the invention the diameter of the metal oxide particles is below 50 nm and is in a particularly preferred manner equal to or below 10 nm.

It can e.g. be a silica particle, which is coated with a monomeric layer of molecules having a group with a basic character. The group with a basic character preferably contains a nitrogen atom and can more particularly be an amine group. An example of molecules able to coat a silica particle with a monomeric layer is e.g. aminophenyl trimethoxysilane (APTMOS).

In a hybrid material according to the invention, the spatial relationship between the polymer matrix and the inorganic part is due to a strong interaction. This strong interaction is more particularly constituted by an ionic interaction between the functional group of the polymer and a functional group of the inorganic part. This ionic interaction is due to the proton transfer from the acid group of the polymer to the basic group of the inorganic part. A hybrid material according to the invention preferably has a homogeneous distribution of the inorganic part. A beneficial effect for the use of the material as the membrane of a fuel cell is the fact that the fuel gas transfer through the membrane is limited. This more particularly applies in the case of fuel cells operating directly with methanol. This effect is further improved if there is a regular distribution of the inorganic part.

A material according to the invention can have a metal oxide content between 1 and 50 wt. %. The metal oxide content is preferably between 6 and 20 wt. % or between 6 and 10 wt. %. The percentages given relate to weight measurements and do not relate to molar mass percentages.

A material according to the invention can also be formed by an inorganic substrate interpenetrated by the polymer, if the metal oxide content is relatively high. Then another spatial structure of the material is obtained. Thus, the material has an inorganic substrate, the substrate being formed by the metal oxide, and the intercalated polymer.

The intercalating of the polymer in the crude inorganic substrate can take place in the absence of a prior integration of the porous support by the ionic polymer. This can be a direct formation of two intercalated spatial structures taking place at the same time.

Such a hybrid material is more particularly formed if the metal oxide content is between 30 and 60 wt. %. The metal oxide content is more particularly in the range 40 to 50 wt. %.

According to the invention it is advantageous if the hybrid material comprises a porous inorganic substrate with an ionic conductive polymer placed within the substrate pores. In the case of the use of the material as a conductive membrane, the conductivity through the membrane is mainly dependent on the number of channels or pores permitting an ion transfer, e.g. hydrogen atomic nuclei (protons) through the membrane. The number of channels is more particularly dependent on the metal oxide content of the material.

According to the invention the inorganic substrate of such a material is the product of a co-condensation of a metal tetraalkoxide and a functionalized trialkoxy metal oxide. As described hereinbefore, the metal can be constituted by silicon. This co-condensation can more particularly take place in the presence of an ionic polymer. This ionic polymer can in particular belong to the family of ionic conductive polymers or aromatic ionomers or heterocyclic ionomers.

The inorganic substrate is preferably porous and can be the product of a co-condensation in a tetraalkoxy silane and trialkoxy silane polymer solution functionalized by basic organic groups in the presence of an ionomer. The ionic polymer can be chosen from among elements of the group of sulphone, phosphorus or carboxyl ionomers and can in particular be a sulphonated polyether ketone.

The basic inorganic groups of the trialkoxy metal (trialkoxy silane) functionalized by said basic group are preferably chosen from among alkyl or acrylamino groups. It can more particularly be an aminophenyl trialkoxy silane. An example of an aminophenyl trialkoxy silane is aminophenyl trimethoxy silane (APTMOS). The alkoxy groups can be chosen from among members of the methoxy, ethoxy and butoxy groups.

A hybrid material according to the invention is more particularly characterized in that the porous inorganic substrate comprises a micro-infrastructure interpenetrated with the ionic conductor. The micro-infrastructure is more particularly present in the form of pores, the size of the pores being in the range of nanometric structures. The size of the pores is preferably between 1 and 10 nm. More particularly the size of the pores is between 2 and 7.5 nm. It can even be within the range 3 to 6 nm.

It is also possible to characterize the structure of the inorganic substrate by its specific surface area. The evaluation of the specific surface area can take place according to the BET method, which is a standard method for evaluating the surface of porous materials. On eliminating the organic part by combustion, values are obtained for the surface between 200 and 120 $m^2/g^{-1}$. Preferably the specific surface area determined by the above method is between 300 and 900 $m^2/g^{-1}$.

The materials formed in accordance with the invention have a transparent, flexible appearance. Most of the materials are relatively mechanically robust.

A property of hybrid materials having a porous inorganic structure is the fact that they have an ionic conductivity equal to or very close to that of the sulphonated polymer of approximately 0.001 to approximately at least 0.1 $Scm^{-1}$.

The manufacture of the membranes and in particular the fixing of the membranes of said material to functional supports is made easier if the material is present in the form of a solution. A material according to the invention can be dissolved in a polar and preferably aprotic solvent. Examples of such solvents are dimethyl formamide (DMF), dimethyl acetamide (DMAc), dimethyl sulphoxide (DMSO) and in particular N-methyl-2-pyrrolidone (NMP).

The hybrid material according to the invention can be a membrane, preferably a membrane used for cationic transfer and more specifically it can be used as a membrane in a fuel cell of the PEM type (proton exchange membrane) and also of the DMFC type (direct methane fuel cell). Such membranes can also be used in all other electrolysis and electrodialysis processes.

A fuel cell according to the present invention has a membrane composed of a hybrid material according to the invention. Such a fuel cell can operate directly with methanol as the fuel. The operating point can be at temperatures above 90° C., or above 110° C. and even above 130° C.

A process for the production of a hybrid material according to the invention is characterized in that the acid polymer matrix is mixed with inorganic components and/or with precursors of said components. Mixing takes place in the presence of at least one solvent. These solvents and/or at least one of their precursors have a functional group which can be fixed to the acid group of the polymer matrix. The fixing and/or formation of the inorganic component takes place in the immediate vicinity of the acid group.

According to a preferred embodiment of this process, the polymer is dissolved in at least one solvent, dissolving taking place in preferred manner under an inert gas and more particularly at a temperature of approximately 130° C. An example of an inert gas usable for dissolving the polymer is nitrogen.

It can also be advantageous if the inorganic component and/or its precursors are dissolved in at least one solvent and for the precursors of the component to be in the same solution of at least one solvent.

A preferred embodiment of the process according to the invention consists of adding to an acid polymer solution a solution containing a dispersion of the metal oxide and/or a solution of precursors of said components. The mixture can be homogenized.

The solvent can be an aprotic polar solvent and more specifically N-methyl-2-pyrrolidone (NMP).

An advantageous form of the production process for the hybrid material is characterized in that the fixing and/or formation of the inorganic part takes place in a sol-gel reaction. It preferably takes place in the presence of water and an acid, organic or mineral catalyst.

According to an embodiment of the process according to the invention one of the precursors of the component can serve as the starting point for the formation of chains. The formation of chains can e.g. take place by polycondensation. Polycondensation can take place either between molecules of the same precursor or between said precursor and another precursor. One of the precursors has a dispersant function, an initiator function of the formation of chains and a function of fixing the chain to the polymer material.

For example, as a result of its basic character, it can e.g. interact with the acid group of the polymer. As a result of this interaction, the distribution of said precursor is oriented by the presence of the acid groups of the polymer. This effect produces a dispersion of said component. The hydrolyzable groups of the same precursor make it possible to bring about a chain formation reaction. This chain formation reaction more specifically takes place by polycondensation with other molecules of the same precursor or molecules of another precursor.

A process according to the invention can be characterized by the use of precursors of inorganic components having a basic group. Preferably said basic group contains nitrogen and can more particularly be an amine group. This basic group interacts with an acid group of the polymer material. An example of a precursor is aminophenyl trimethoxy silane (APTMOS).

In a process according to the invention a precursor can be tetraethoxy silane (TEOS), which can e.g. be fixed by polycondensation to APTMOS. Oligomeric or polymeric chains with several $SiO_2$ groups can be arranged in such a way that $SiO_2$ networks form. Such a process can be performed on the basis of a weight ratio between TEOS and APTMOS of at least 70:30 (i.e. at least 70 wt. % TEOS and at the most 30 wt. % APTMOS) and preferably between 80:20 and 95:5.

A process according to the invention can be characterized in that the inorganic part is a $SiO_2$ particle having basic groups on its surface. These basic groups can be located on the surface of the particle by the condensation of APTMOS molecules with silanol groups of the surface of the particles. In such a process it can be preferable for the weight ratio between the silica and APTMOS particles to be greater than 60:40 (i.e. at least 60 wt. % silica and at the most 40 wt. % APTMOS) and more preferably between 80:20 and 95:5. A preferred embodiment of the invention involves a transfer of particles from an aqueous solvent to the organic solvent of the polymer.

A process according to the invention can involve the formation of a membrane. The formation of the membrane can more particularly take place by a process of pouring the polymer material mixture with the inorganic component and/or the precursors of the component on a support.

A material according to the invention can also be obtained by the co-condensation of a metal tetraalkoxide (silicon) and functionalized trialkoxy metal (trialkoxy silane) in an ionic conductive polymer solution. The formation can take place as a single process. It is possible for the process to take place directly and in the absence of an impregnation of the organic substrate with an ionic polymer. The ionic conductor is preferably an ionic conductive polymer, aromatic ionomer or heterocyclic ionomer. It is more particularly a sulphone, phosphorus or carboxyl ionomer. The ionic conductive polymer can thus be chosen from the group of sulphone, phosphorus or carboxyl ionomers and is more particularly a member of the group of sulphonated polyether ketones.

The co-condensation of the material more particularly takes place in an aprotic solvent with a high relative dielectric constant of at least greater than 37 and preferably greater than 45. The co-condensation of these materials more particularly takes place in high metal oxide component concentrations. The concentration of the metal oxide component is more particularly in a range above 35% and can extend to 60%. It is more particularly in the range 40 to 50%. Porous inorganic structures are then produced, within which the polymer component is interpenetrated by the metal oxide network.

The materials according to the invention have a thermal stability extending at least into the range 90 to 160° C. and can also cover the temperature range 120 to 175° C.

During co-condensation, the production of a membrane can comprise the formation of a mixture of ionic polymer and silica precursors in a common solvent and the formation of a membrane from said mixture by pouring, casting or extrusion. The solvent can then be evaporated at ambient temperature or by heating to temperatures up to 90° C. This permits the easy creation of membranes, even large membranes.

Hybrid polymer materials according to the invention are hybrids between organic polymers and mineral oxides. These materials combine within the same composite material and in a complimentary manner the properties of each of the components. One method for the manufacture of such hybrid materials according to the invention consists of using a sol-gel process for obtaining a dispersion between the organic polymer phase and the inorganic phase on a molecular or nanometric scale. Such sol-gel processes permit the preparation of dispersed materials resulting from the growth of oxo-metallic polymers in a solvent. The reaction is generally subdivided into two stages: metal alkoxide hydrolysis leading to the creation of hydroxyl groups, followed by the polycondensation of hydroxyl groups and alkoxy groups in order to form a three-dimensional network. A general diagram of such a process is given in FIG. 1. This diagram illustrates the polymerization of a silicon alkoxide and can be used in the invention. In the case of a metal oxide other than silicon, such as titanium or zirconium, the hydrolysis and condensation do not require a catalyst, as a result of the high reactivity of the alkoxide. However, in the case of a silicon alkoxide and as shown in FIG. 1, the sol-gel process is catalyzed in an acid or basic medium. Within the scope of the invention silicon can be substituted by Ti or Zr. In order to facilitate the understanding of the claims use has been made of the term $SiO_2$. It is therefore possible to replace the term $SiO_2$ in the text by "$SiO_2$ or $TiO_2$ or $ZrO_2$."

Hereinafter, the implementation of the invention is also represented with the aid of the following groups of examples.

1st GROUP OF EXAMPLES s-PEEK-TEOS-APTMOS System

A hybrid material according to the invention can be a s-PEEK-silica and can be obtained from the sulphonated PEEK polymer and from the precursors TEOS and APTMOS. Hydrolysis and acid catalyzed condensation of TEOS and APTMOS takes place. These precursors, whereof APTMOS has the dispersing function, are added to the polymer solution. The growth of silica particles, i.e. the polycondensation reaction, takes place within the solution. An example of the hybrid material obtaining process is shown in FIG. 2. A 10 wt. % sulphonated PEEK solution in N-methyl pyrrolidone (NMP) is prepared by solubilizing the polymer at 130° C. under nitrogen, followed by filtration. TEOS and APTMOS are dissolved in NMP and added to the polymer solution. Stirring of the mixture is maintained up to homogenization, followed by the addition of the requisite quantities of water and 1 M hydrochloric acid, dissolved in NMP. The solution is then heated, accompanied by stirring, to 60° C. until a homogeneous solution is obtained and on the basis of which the membrane is cast in accordance with the conventional procedure.

Within said preparation, it is possible to vary two parameters:
i. the silica weight percentage in the hybrid membrane and
ii. the precursor/dispersant (TEOS/APTMOS) weight ratio.

FIG. 3 gives the composition of several examples of hybrid polymer materials described hereinafter. The samples corresponding to these examples are designated s-PEEK-TEAP x.y.z. with
i. x=wt. % $SiO_2$ (in the hypothesis of a complete conversion of silanes into silica) and
ii. y/z=the weight ratio between the precursor and the dispersant (TEOS/APTMOS).

The formation of membranes used for different characterizations can take place by a conventional solution casting preparation. The solvent (NMP) can be evaporated in vacuo at a temperature of approximately 100° C. for 4 hours. The hybrid polymer material films are then detached from their support by immersion in water. A treatment of the films by a dilute hydrochloric acid solution can then follow in order to eliminate any trace of solvent. The membrane is then obtained in its protonated form.

The cation exchange capacity of the s-PEEK-silica membranes can be measured by acid-basic dosing. Samples in acid form are treated by a saturated NaCl solution at 90° C. and for 3 hours. The protons freed into the sodium solution are dosed by titration using a 0.1 M NaOH solution. The cation exchange capacity (cec) of the material, expressed in meq/g, is calculated as the number of dosed protons relative to the dehydrated s-PEEK-silica sample mass. FIG. 5 shows the cation exchange capacity (cec) of the s-PEEK-TEAP membranes of the samples as a function of the introduced APTMOS quantity. The cation exchange capacity of the hybrid membranes decreases linearly when the APTMOS quantity increases.

However, the values of FIG. 4 show that the experimental cation exchange capacity for all the samples slightly exceeds the calculated cation exchange capacity. These results indicate that all the $NH_2$ functions have not been protonated.

A thermogravimetric analysis of the sulphonated PEEK can be carried out using a heating gradient of 10° C./minute. Thermogravimetric analysis can be used for determining the silica content of the samples. Prior to the analysis, the membranes are placed in an oven at 50° C. for one hour.

Figure 6:
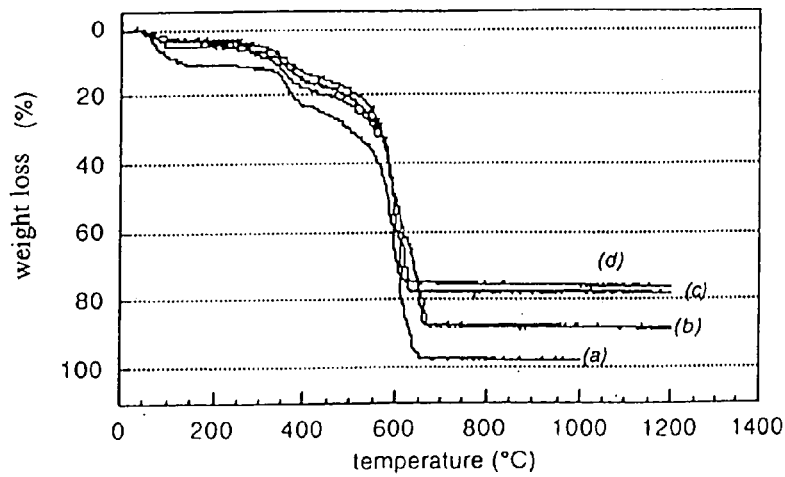
FIG. 6 demonstrates the results of the thermogravimetric analyses obtained for samples of s-PEEK and s-PEEK-TRAP membranes formed in accordance with the invention.

FIG. 6 shows the results of the thermogravimetric analyses obtained for samples of s-PEEK and s-PEEK-TEAP membranes.

The general configuration of the thermograms of the hybrid membranes is substantially the same as that of an unmodified s-PEEK membrane. The first weight loss, which occurs between 20 and 100° C., corresponds to sample dehydration. However, it can be seen that the hybrid membranes have a lower water loss than in the case of a pure polymer membrane. The second weight loss, which starts at around 250° C., corresponds to polymer desulphonation. The desulphonation of the hybrid membranes occurs significantly earlier than with the pure polymer. The decomposition of the polymer occurs at approximately 400° C., no matter which sample is involved.

The polymer combustion residue at 1200° C. makes it possible to evaluate the silica quantity contained in the hybrid membrane. In the hypothesis of a total conversion of the precursors, a theoretical silica content has been calculated. The compositions of the hybrid membranes based on TEOS are compared in FIG. 7.

Figures 7, 8, 9:
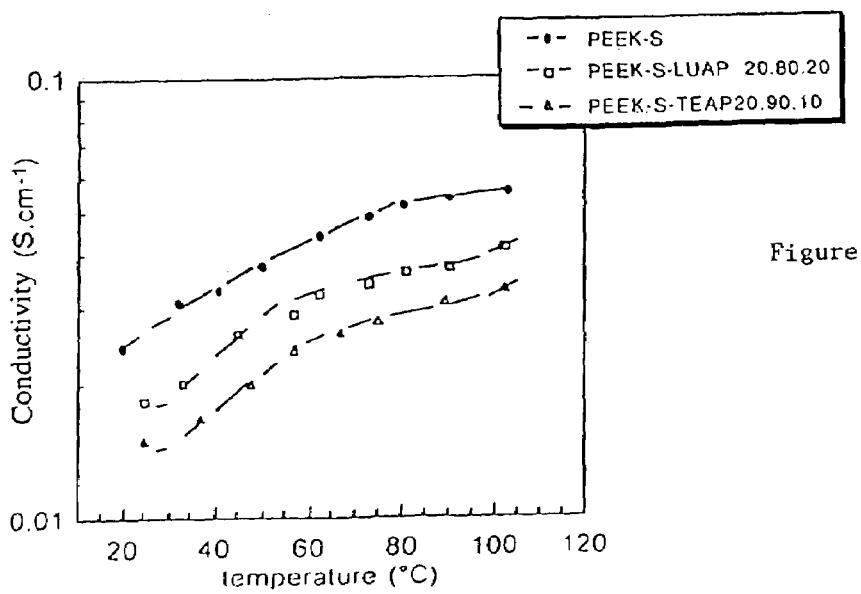
FIG. 7 shows a comparison of hybrid membranes based on TEOS.
FIG. 8 demonstrates electrical conductivity values of hybrid samples obtained at 100% relative humidity for 20° C. and 100° C.
FIG. 9 demonstrates conductivity as a function of membrane temperatures.

The electrical conductivity of the samples was measured and FIG. 8 shows the conductivity values obtained at 20° C. and 100% relative humidity.

In order to determine the evolution of the conduction properties of the s-PEEK-silica membranes with the temperature, the conductivity measurements at 20° C. were supplemented by conductivity measurements at a temperature varying between 20 and 100° C. for 100% relative humidity. FIG. 9 shows the evolution of conductivities as a function of the temperature of the membranes of different samples.

In the studied temperature range, there is a virtually identical conductivity behaviour of the hybrid membranes under the same conditions as compared with s-PEEK prior to the introduction of the mineral filler.

Figures 10, 11:
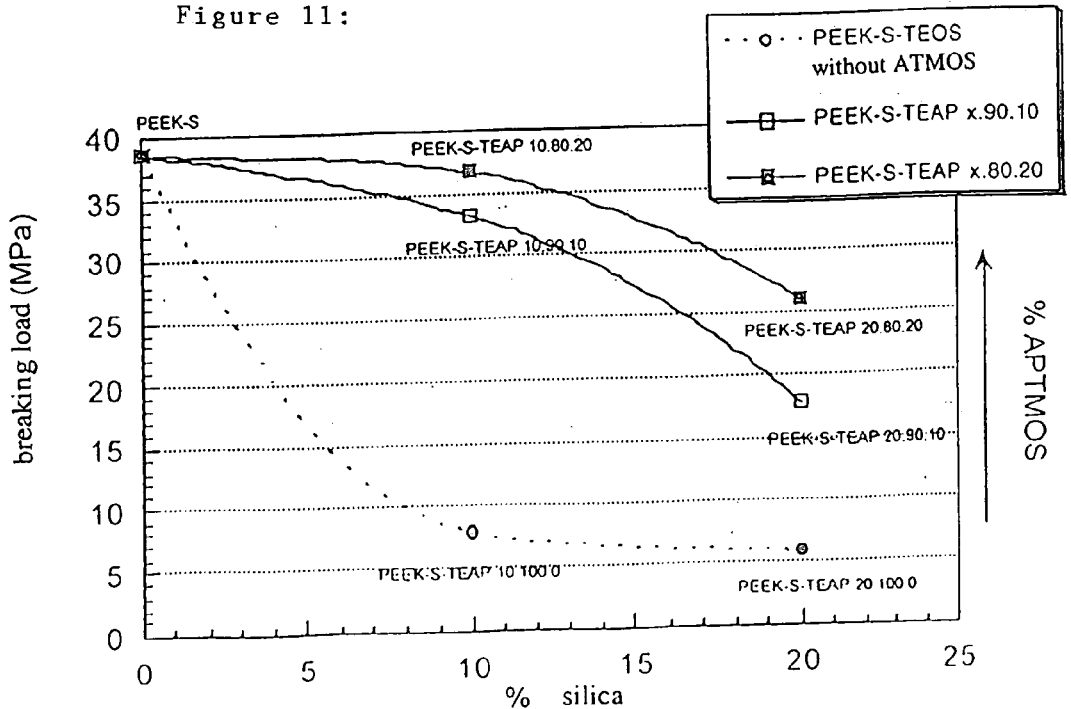
FIG. 10 is a table showing values obtained with different samples of the hybrid system.
FIG. 11 shows variations of the breaking loads of the hybrid membranes.

The introduction of aminophenyl siloxane into the s-PEEK-TEAP membranes establishes a link between the organic matrix and the silica network via the ionic interaction between the $SO_3^-$ and the $NH_3^+$ groups. In order to evaluate the influence of this ionic crosslinking on the mechanical properties of the s-PEEK-silica membranes, tensile tests were carried out. FIG. 10 is a table showing the values obtained with the different samples of the hybrid system during the breaking load tests.

FIG. 11 is a graph showing the variations of the breaking load of hybrid membranes as a function of the silica content and the APTMOS quantity.

For a given silica content, the breaking loads of the hybrid membranes, including APTMOS, are between the two extreme breaking load values for s-PEEK and APTMOS-free hybrid membranes. This evolution reveals the influence of ionic crosslinking in hybrid membranes on the maintaining of the mechanical properties of the unmodified organic matrix.

Figures 19, 20:
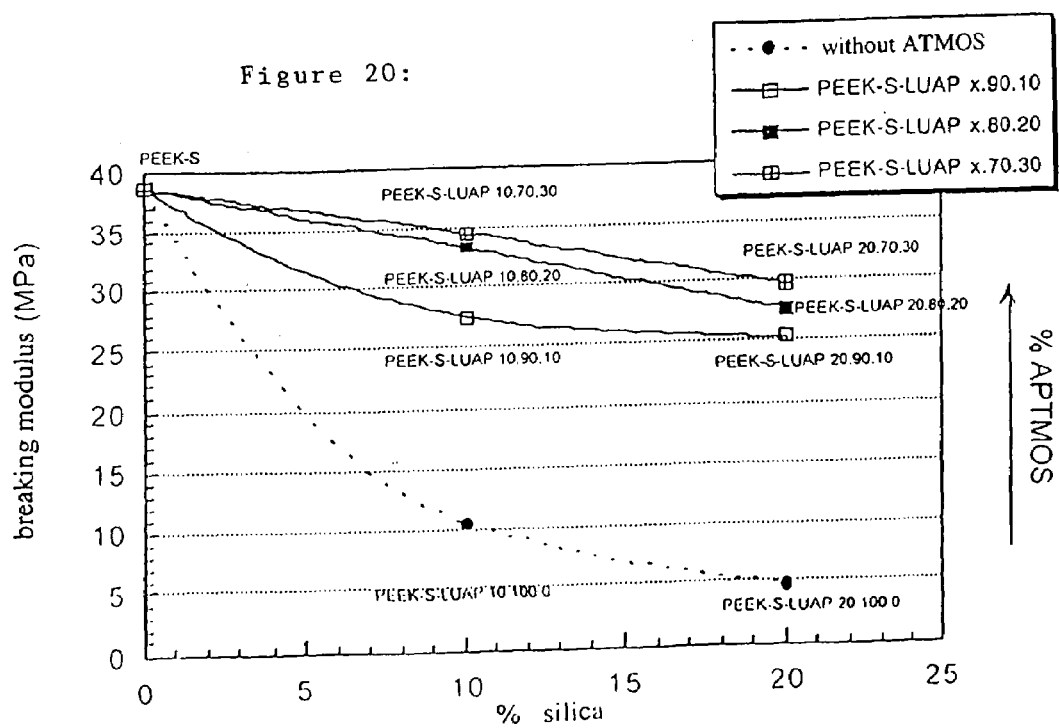
FIG. 19 shows the results of mechanical tests performed on composite membranes.
FIG. 20 is a graphical representation of breaking load with silica charge and APTMOS quantity.

The maximum elongation values given in the table of FIG. 20 confirm that the rigidity of the membrane increases when silica is introduced. This phenomenon is accentuated by APTMOS introduction.

The influence of APTMOS on the dispersion of silica particles for s-PEEK-TEAP hybrid membranes was analyzed by transmission electron microscopy and is shown in FIG. 12. The micrograph of a membrane section is shown in FIG. 12(a) for a s-PEEK-TEAP membrane 20.100.0 and in FIG. 12(b) for a s-PEEK-TEAP membrane 20.90.10. The two membranes have the same silica weight content. With the same magnification (×10,000), it is possible to see aggregates located in sample (a) without APTMOS, whereas sample (b) prepared in the presence of APTMOS as the dispersant reveals no particle aggregation. In the second case there is consequently a network interpenetrated by silica and polymer fibres.

Under a higher magnification (×50,000) in FIG. 13, the s-PEEK-TEAP sample 20.90.10 has very small silica particles organized in accordance with a 10 nm wide strip network. It can be seen that an increasing content of APT-MOS as the precursor in the sol-gel reaction leads to a reduction in the size of the silica particles.

2nd GROUP OF EXAMPLES

Nanometric Size Silica Particles Having a Surface with a Basic Character

This second group of examples refers to systems involving a transfer of silica nanoparticles from a colloidal, aqueous solution to a polymer solution. The polymer solution is e.g. a solution in NMP. Silica particles in colloidal suspension are marketed under the name LUDOX® and LUDOX LSD® by Du Pont de Nemours. Such silica particles in a colloidal suspension have no internal surface and are not crystalline. They are dispersed in an alkaline medium and carry a negative charge. This negative charge produces the repulsion between the particles and stabilizes the colloidal form.

The addition of LUDOX to the polymer solution is followed by the evaporation of the solvent having the lower boiling point. During the evaporation of the water, the silica particles are transferred from the aqueous phase to the organic phase, without aggregation. The obtaining of an optimum dispersion is aided by the presence of APTMOS. The requisite quantities of LUDOX and APTMOS, to which NMP is added, are added to the polymer solution with 10 wt. % s-PEEK in NMP. The solution is stirred and heated up to the complete phase transfer and the obtaining of a homogeneous solution, from which the hybrid membrane will be prepared.

Different samples of variable composition are described hereinafter in connection with this example. The samples are designated s-PEEK-LUAP x. y. z., x being the weight percentage of silica contained in the sample and y/z the ratio used between LUDOX and APTMOS. The compositions of the samples appear in FIG. 14.

Figures 15, 16:
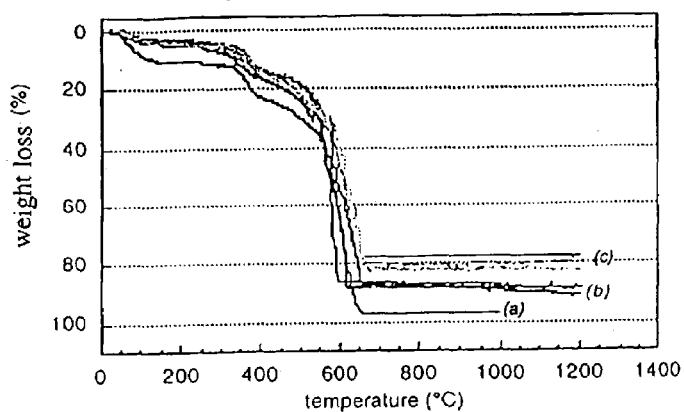
FIG. 15 demonstrates the results of thermogravimetric analysis of the hybrid membranes identified in FIG. 14.
FIG. 16 shows the compositions of several s-PEEK-LUAP membranes.

FIG. 15 shows the results of the thermogravimetric analysis of the LUDOX-based s-PEEK-silica membranes. As for example 1, the composite membranes have the same weight loss profile as the pure polymer. However, there is a lower water loss for the hybrid membranes. Between 20 and 100° C., they lose between 2 and 3% water, as against 12% in the case of the pure s-PEEK membrane. The loss of sulphonic groups starts at around 230° C. for s-PEEK-TEAP samples. The decomposition temperature of the pure polymer is not modified in the case of hybrid membranes and occurs at 400° C.

The experimental composition of the hybrid membranes was calculated on the basis of a combustion residue constituted by silica. The composition of the s-PEEK-LUAP membranes appears in the table of FIG. 16.

Figures 17, 18:
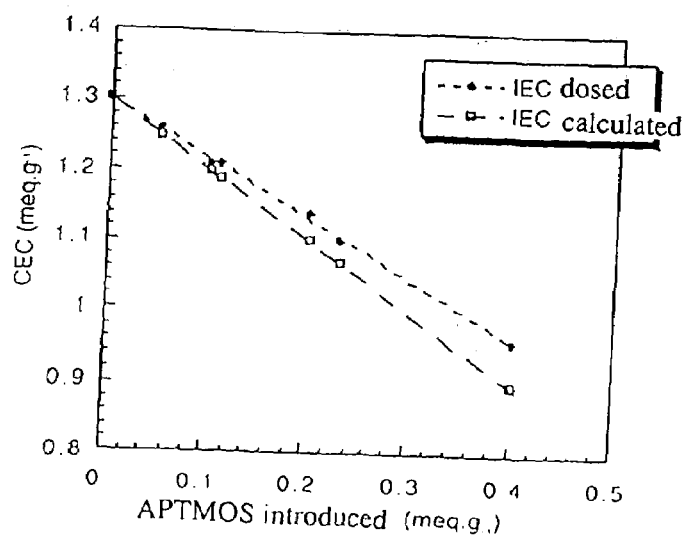
FIG. 17 demonstrates electrical conductivity values of hybrid samples obtained at 100% relative humidity for 20° C. and 100° C. when there is an increase in APTMOS quantity.
FIG. 18 illustrates the cation exchange capacity as a function of introduced APTMOS quantity.

It can be seen that for these membranes, the cation exchange capacity decreases linearly when there is an increase in the APTMOS quantity introduced (table of FIG. 17). The variation between the experimental and calculated cation exchange capacity values shows that there has not been a total transfer of protons between the aminophenyl and sulphone functions. The coexistence of the $NH_3^+$ proton donor group and the $NH_2$ proton acceptor group should favour proton conduction. FIG. 18 shows the cation exchange capacity as a function of the introduced APTMOS quantity.

The behaviour of the electrical conductivity as a function of temperature was described in example 1 and appears in FIG. 9.

The results of mechanical tests performed on these composite membranes appear in the table of FIG. 19. There are identical evolutions with regards to the breaking load and maximum elongation for LUDOX-based membranes as in example 1. The breaking load decreases with the silica charge, but can be significantly restored when a small amount of APTMOS is introduced. Thus, there is a breaking load restored to 71% for s-PEEK-LUAP 10.90.10 and up to 90% for s-PEEK-LUAP 10.70.30. The evolution of the breaking load with the silica charge and with the APTMOS quantity is shown in the graph of FIG. 20, which reveals the influence of ionic crosslinking on the mechanical properties of LUDOX-based hybrid membranes.

The influence of APTMOS introduction on the "morphology" of a section through a hybrid membrane obtained from LUDOX can be gathered from FIGS. 21(a) and 21(b). FIG. 21(a) shows the result of transmission electron microscopy through a s-PEEK-LUAP 20.100.0 membrane and FIG. 20(b) the same microscopy of a s-PEEK-LUAP 20.90.10 membrane. The two microscopies were performed with a magnification of ×10,000. On comparing the two drawings, it can be seen that the silica dispersion is significantly improved by APTMOS introduction. Thus, particle aggregates can be identified in the membrane not containing a dispersant, whereas the sample containing APTMOS has a quasi-homogeneous dispersion, where only a few aggregates remain. On the basis of the microscopic studies of the membrane of variable APTMOS/LUDOX composition, it can be seen that a s-PEEK-LUAP 10.80.20. sample gives a virtually perfectly homogeneous silica dispersion. No aggregate remains and observation under a magnification of ×50,000 reveals individualized silica particles of approximately 10 nm. This particle size is in accordance with the particle size indicated for the commercial LUDOX solution. Thus, it is possible to carry out a transfer of particles without particle agglomeration for a LUDOX:APTMOS ratio of 80:20. A view under ×50,000 magnification of s-PEEK-LUAP 10.80.20 appears in FIG. 22.

Figures 23, 24:
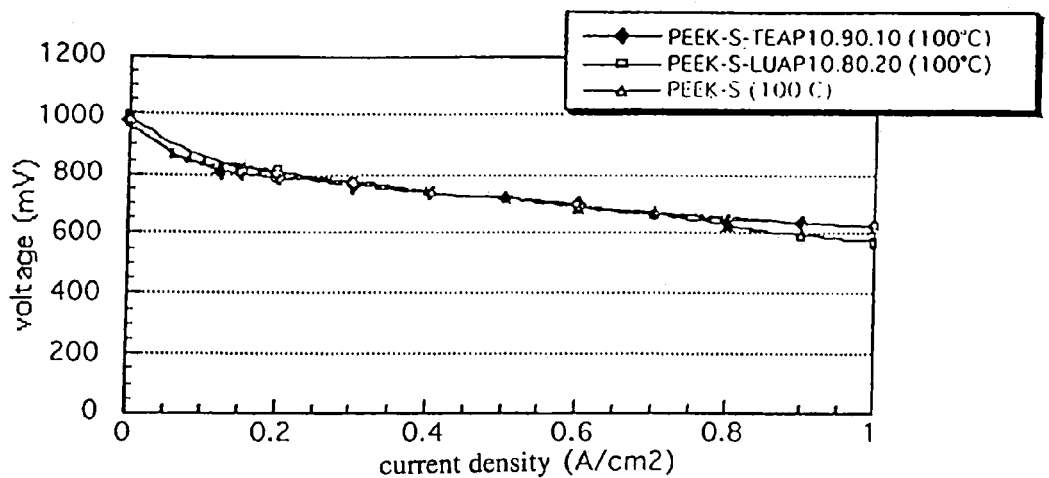
FIG. 23 shows polarization curves recorded for composite membranes containing 10% silica
FIG. 24 is a table showing strength and conductivity values for fuel cell membranes at 100° C.

The performances of the composite membranes prepared from TEOS and LUDOX were evaluated. FIG. 23 gives the polarization curves recorded for composite membranes containing 10% silica and for which the best dispersion of the component in the organic matrix was observed. These measurements were performed for 50 μm thick membranes and for $O_2$ and $H_2$ gas pressures of 3.6 bars. The gas humidification temperature is 90° C. The table of FIG. 24 gives the strength and conductivity values for the fuel cell membranes at 100° C.

3rd GROUP OF EXAMPLES

Inorganic Porous Structure

The table of FIG. 25 shows the results obtained with large silica and therefore metal oxide concentrations. Structures are obtained where there is a hybrid material with an inorganic substrate interpenetrated by the polymer. With silica contents above 25 wt. % and using solvents with a high dielectric constant, permitting a salvation of ion pairs with strong electrostatic interactions, the results of the table are obtained. Therefore they prevent the aggregation of ion pairs. Using NMP (N-methyl-pyrrolidone) or DMF (dimethyl formamide) with relative dielectric constants of 30.2 and 37.8 respectively, a phase separation can be observed. Using solvents having an even higher dielectric constant such as tetramethyl urea or DMSO (dimethyl sulphoxide) with a dielectric constant of 48.9, the homogeneity of the dispersion of the silica is greater. FIG. 25 shows the influence of the aminopropyl triethoxy silane level on the silica dispersion in the case of 60 wt. % silica. In each case the silica source is tetraethoxy silane (THEOS). The table shows the silica weight percentage and the result obtained in FIG. 25 reveals that transparent, flexible membranes are obtained from a certain region and with a decreasing number of amino functions. Opaque, mechanically strong membranes are obtained on entering the phase separation zone. Just below the threshold, hybrid systems have electrical conductivities equal to or only slightly below that of the silica-free s-PEEK polymer (better than $10^{-2}$ Scm$^{-1}$ with 100% relative humidity at 25° C.)

The table of FIG. 25 also shows the product co-condensation formation conditions. The synthesis temperature is in the range 60 to 80° C., but can also be at ambient temperature.

FIG. 26 is a transmission electron microscopic observation (TEM) showing morphological arrangements differing very greatly from the results according to FIGS. 1 to 24 (examples I and II). The silica is illustrated by clear zones, the black background of the image corresponding to the intercalated, organic polymer zones. The size of the ranges is smaller than 5 nm. In the phase with a relatively low APTMOS content, microscopic, aligned silica grains are obtained. A porous structure in the incipient stage and silica particles accompanied by sulphonated PEEK can appear. These systems have a very high mechanical strength compared with membranes prepared with lower silica levels. FIG. 26 shows such a shot.

In the case of transparent membrane observation, silica particles are no longer observed, even under high magnification.

There is a mesoporous silica matrix interpenetrated by sulphonated PEEK. There is a homogeneous integration of organic and inorganic components. The silica and sulphonated PEEK networks interpenetrate forming co-continuous ranges with similar dimensions, the smallest dimension of said ranges being at a level below 4 nm. The silica is located in the hydrophilic regions of the polymer. By analyzing the system by calcining the polymer, a porous structure remains and constitutes a replica of the polymer structure characterized by a nitrogen adsorption and desorption.

FIG. 27 shows the isotherms obtained with the BET method. By analysis of the isotherms it can be seen that the silica has a very large surface area of around 700 m$^2$/g$^{-1}$. The shape of the isotherm is typical of a mesoporous solid with a narrow pore distribution in the range between 3.5 and 4 nm. This is in accordance with the transmission electron microscopic photographs. The volume of the pores of the absorption and desorption spectra of the measurement make it possible to evaluate the size of the pores with a volume of 0.6 cm$^3$ g$^{-1}$ and a pore diameter of approximately 3.4 to 4.5 nm. The measurement shown was made with a 50% silica content and with a membrane having a conductivity of 2.10$^{-2}$ Scm$^{-1}$, identical to that of the pure sulphonated polymer.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A hybrid material comprising a proton conducting polymer having acid groups which are sulphonic groups, said hybrid material including a metal oxide component having at least two $Me_xO_y$ per molecule, each molecule of the metal oxide component containing at least one basic functional group due to a group containing nitrogen, the metal oxide component being formed by metal oxide particles, permitting an interaction and a spatial relationship with the acid groups of the polymer; and wherein the polymer is formed from at least one of the group consisting of aromatic polysulphones, sulphonic aromatic polyarylether ketones, sulphonated aromatic polysulphones, sulphonated aromatic polyether sulphones (PES), and sulphonated aromatic polyphenylether sulphones (s-PPSU).

2. The hybrid material according to claim 1, wherein the hybrid material forms a polymer matrix.

3. The hybrid material according to claim 1, wherein the metal oxide component is present in the form of at least dimeric network chains.

4. The hybrid material according to claim 3, wherein the metal oxide component is coated with a monomeric thickness layer of molecules having a basic functional group containing nitrogen.

5. The hybrid material according to claim 1, wherein the metal oxide component is formed from metal oxide particles having on their surface, at least locally, a basic functional group containing nitrogen.

6. The hybrid material according to claim 5, wherein the metal oxide component has a diameter not greater than about 10 nm.

7. The hybrid material according to claim 1, wherein the metal oxide component is between about 1 and 35 wt. %.

8. A structure comprising the hybrid material according to claim 1 and a porous inorganic substrate wherein the porous inorganic substrate is within the hybrid material and the porous inorganic substrate is interpenetrated by the proton conducting polymer.

9. The hybrid material according to claim 8, wherein the metal oxide content is between about 30 and 60 wt. %.

10. The hybrid material according to claim 8, wherein the inorganic substrate is the product of a co-condensation of a metal tetraalkoxide and a functionalized trialkoxy metal.

11. The hybrid material according to claim 10, wherein the co-condensation takes place in the presence of the proton conducting polymer.

12. The hybrid material according to claim 8, wherein the porous inorganic substrate is the product of a co-condensation in a solution of the tetraalkoxy silane polymer and trialkoxy silane functionalized by the basic organic groups, in the presence of the proton conducting polymer.

13. The hybrid material according to claim 12, wherein the basic organic groups comprise one of alkylamino and arylamino groups.

14. The hybrid material according to claim 12, wherein the alkoxy groups are selected from the group consisting of methoxy, ethoxy and butoxy groups.

15. The hybrid material according to claim 8, wherein the inorganic substrate is porous and comprises a microinfrastructure interpenetrated with the proton conducting polymer.

16. The hybrid material according to claim 15, wherein the microinfrastructure includes pores, the pores having a diameter of between about 1 and 10 nm.

17. The hybrid material according to claim 1, wherein the metal oxide is an oxide comprising one of Zr, Ti and Si.

18. The hybrid material according to claim 1, wherein the hybrid material is dissolved in a polar solvent.

19. The hybrid material according to claim 1, wherein the hybrid material is a membrane.

20. The hybrid material according to claim 19, wherein the hybrid material is a fuel cell membrane.

21. A fuel cell comprising at least one membrane is formed from the hybrid material according to claim 1.

22. The fuel cell according to claim 21, wherein the fuel cell operates with methanol and at a temperature about 100° C.

23. A process for the production of a hybrid material according to claim 1, comprising the step of mixing the proton conducting polymer having acid groups which are sulphonic groups with at least one of the metal oxide component and a precursor of the metal oxide component having at least two $Me_xO_y$ per molecule in the presence of at least one solvent, the at least one metal oxide component and a precursor having a basic functional group containing nitrogen permitting an interaction with an acid group of the polymer, so that the reaction takes place in the immediate vicinity of the acid group.

24. The process according to claim 23, wherein the polymer is dissolved in at least one polar solvent.

25. The process according to claim 23, wherein the at least one of the metal oxide component and a precursor are dissolved in at least one solvent.

26. The process according to claim 23, wherein the precursors of the metal oxide component are jointly in a solution with at least one solvent.

27. The process according to claim 23, wherein the at least one of a metal oxide component and a precursor of said component is added to proton conducting polymer solution and the mixture is homogenized.

28. The process according to claim 23, wherein the at least one solvent is an aprotic polar solvent.

29. The process according to claim 23, wherein the mixing step takes place in accordance with a sol-gel reaction.

30. The process according to claim 23, wherein the precursor of the metal oxide component has a functional group in the form of functionalized alyoxy silane $(R'O)_3SiR''$ or $(R'O)SiR_2''$.

31. The process according to claim 23, wherein a precursor of the component is a metal alkoxide $(RO)_xM$.

32. The process according to claim 31, wherein the weight ratio of the metal alkoxide precursor to the functionalized alkoxy silane is at least about 70:30.

33. The process according to claim 23, wherein the metal oxide component is a metal oxide particle having the functional groups on its surface.

34. The process according to claim 33, wherein the weight ratio between the metal oxide particles and the functionalized alkoxy silane is about 60:40.

35. The process according to claim 23, wherein the permitting the transfer of the organic component from an aqueous solution to a polymer solution in an organic solvent.

36. The process according to claim 23, wherein following the reaction, solvent extraction takes place.

37. The process according to claim 23, wherein prior to the extraction of the solvent, a membrane is formed.

38. The process according to claim 23, wherein the membrane with its porous support is produced by the co-condensation of silicon tetraalkoxide and functionalized trialkoxy silane in an proton conducting polymer solution.

39. The process according to claim 38, wherein the membrane is formed in the absence of an impregnation of the inorganic substrate by a proton conducting polymer.

40. The process according to claim 38, wherein the co-condensation takes places in an aprotic solvent with a high dielectric constant.

41. The process according to claim 40, wherein the relative dielectric constant is at least in excess of 37.

42. A structure comprising a hybrid material and a porous inorganic substrate; the hybrid material comprising a proton conducting polymer having acid groups, said hybrid material including a metal oxide component having at least two $Me_xO_y$ per molecule, each molecule of the metal oxide component containing at least one basic functional group due to a group containing nitrogen, the metal oxide component being formed by metal oxide particles, permitting an interaction and a spatial relationship with the acid groups of the polymer;

wherein the porous inorganic substrate is within the hybrid material and further comprises a microinfrastructure interpenetrated by the proton conducting polymer; and wherein the microinfrastructure includes pores having a diameter of between about 1 and 10 nm.

43. The structure of claim 42, wherein the polymer is formed from at least one of the group consisting of polyheterocyclics, polyaromatics, polysulphones, sulphonic polyarylether ketones, sulphonated polysulphones, sulphonated polyether sulphones (PES), sulphonated polyphenylether sulphones (s-PPSU); sulphonated styrene/ethylene copolymers (s-SES), sulphonated styrene/butadiene copolymers (s-SBS) and sulphonated styrene/isoprene copolymers.

* * * * *